(12) United States Patent
Guo et al.

(10) Patent No.: US 11,643,128 B2
(45) Date of Patent: May 9, 2023

(54) BABY CARRIAGE BRAKE MECHANISM AND BABY CARRIAGE HAVING THE SAME

(71) Applicant: WONDERLAND SWITZERLAND AG, Steinhausen (CH)

(72) Inventors: Zhengwen Guo, Guangdong (CN); Wanquan Zhu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/371,997

(22) Filed: Jul. 9, 2021

(65) Prior Publication Data
US 2022/0009538 A1    Jan. 13, 2022

(30) Foreign Application Priority Data
Jul. 9, 2020 (CN) .......................... 202010659794.8

(51) Int. Cl.
*B62B 9/08*    (2006.01)
*B62B 7/04*    (2006.01)

(52) U.S. Cl.
CPC ................ *B62B 9/082* (2013.01); *B62B 7/04* (2013.01); *B62B 9/087* (2013.01);
(Continued)

(58) Field of Classification Search
CPC ........... B62B 9/082; B62B 7/04; B62B 9/087; B62B 2202/42; B62B 2301/044;
(Continued)

(56) References Cited

U.S. PATENT DOCUMENTS 4,997,066 A    3/1991    Ampafrance
6,742,791 B2   6/2004    Lan
(Continued)

FOREIGN PATENT DOCUMENTS

CN    108820029 A  * 11/2018 ............... B62B 9/00
CN    109353401 A  *  2/2019 ............... B62B 9/08
(Continued)

OTHER PUBLICATIONS

Translated KR-101355522-B1 (Year: 2022).*
(Continued)

*Primary Examiner* — James A Shriver, II
*Assistant Examiner* — Ian Bryce Shelton
(74) *Attorney, Agent, or Firm* — Hauptman Ham, LLP

(57) ABSTRACT

The disclosure provides a baby carriage brake mechanism and a baby carriage. The baby carriage brake mechanism includes a frame, a brake drive assembly, linkage assemblies, brake locks and wheels. The brake drive assembly is disposed on the frame. The linkage assemblies are respectively slidably disposed on the frame on both of left and right sides. Both ends of the brake drive assembly are respectively in abutting connection with the two linkage assemblies. The linkage assemblies are coupled to the brake locks. Two wheels are respectively pivotally disposed at both sides of the frame. By driving the brake drive assembly to push the linkage assemblies to act with the brake locks, the brake locks on both sides are engaged with the wheels, thereby locking the wheels on both sides. Therefore, the baby carriage brake mechanism of the disclosure may brake wheels on both sides simultaneously with simple operation.

18 Claims, 21 Drawing Sheets

(52) U.S. Cl.
CPC ..... *B62B 2202/42* (2013.01); *B62B 2301/044* (2013.01); *B62B 2301/0463* (2013.01)

(58) Field of Classification Search
CPC ... B62B 2301/0463; B62B 7/062; B62B 7/06; B62B 9/00; B62B 33/02; B62B 5/0461; B62B 9/08; B62B 9/085; B62B 5/0433; B62B 5/0457; B62B 5/0438; B62B 33/025; B62B 33/021; B62B 33/026
See application file for complete search history.

(56) References Cited

U.S. PATENT DOCUMENTS

| | | | | |
|---|---|---|---|---|
| 9,139,044 | B1* | 9/2015 | Tsai | B60B 33/021 |
| 2003/0057681 | A1* | 3/2003 | Lan | B62B 9/082 |
| | | | | 280/642 |
| 2007/0045055 | A1* | 3/2007 | Lan | B62B 9/082 |
| | | | | 188/31 |
| 2017/0229751 | A1 | 8/2017 | Brown | |
| 2018/0043917 | A1* | 2/2018 | Plested | B62B 7/068 |
| 2018/0043918 | A1* | 2/2018 | Plested | B62B 9/087 |
| 2018/0050717 | A1* | 2/2018 | Yeo | B62B 5/04 |
| 2018/0229751 | A1* | 8/2018 | Yabuuchi | B62B 9/087 |
| 2020/0172142 | A1* | 6/2020 | Young | B62B 7/142 |

FOREIGN PATENT DOCUMENTS

| | | | | |
|---|---|---|---|---|
| CN | 109383600 | A * | 2/2019 | |
| CN | 110171460 | A * | 8/2019 | |
| DE | 202018004969 | U1 * | 12/2018 | |
| DE | 202018106876 | U1 * | 3/2019 | |
| EP | 1488983 | A2 * | 12/2004 | ............ B62B 9/082 |
| JP | H02102868 | A | 4/1990 | |
| JP | 2011235662 | A | 11/2011 | |
| JP | WO2010143300 | A1 | 11/2012 | |
| JP | 6651095 | B1 | 2/2020 | |
| KR | 101355522 | B1 * | 1/2014 | |
| TW | 201434698 | A | 9/2014 | |
| WO | WO-2020057810 | A1 * | 3/2020 | ........... B62B 5/0046 |

OTHER PUBLICATIONS

Translated WO-2020057810-A1 (Year: 2022).*
Translated CN-108820029-A (Year: 2022).*
Office Action mailed in corresponding Japanese Patent Application No. 2021-113673 dated Jun. 14, 2022, consisting of 8 pp. (English Translation Provided).
Office Action issued in counterpart Australian Patent Application No. 2021204705 dated Aug. 26, 2022.
Office Action issued in counterpart Taiwan Patent Application No. 110125171 dated Sep. 12, 2022.

* cited by examiner

BABY CARRIAGE BRAKE MECHANISM AND BABY CARRIAGE HAVING THE SAME

CROSS REFERENCE TO RELATED APPLICATIONS

This application is based upon and claims priority to Chinese Patent Application No. 202010659794.8, filed on Jul. 9, 2020, the entire contents thereof are incorporated herein by reference.

TECHNICAL FIELD

The disclosure relates to the field of baby carriages, and particularly a baby carriage brake mechanism and a baby carriage having the same.

BACKGROUND

A baby carriage is a tool carriage designed to facilitate outdoor activities for infants and young children, and it has long been widely used. At present, all the existing baby carriages have a bottom equipped with front wheels and rear wheels. Among them, the number of rear wheels is generally two, and the two rear wheels are respectively provided with a brake mechanism. When the baby carriage needs to be braked, the use has to use his/her foot/feet to step on both of the brake mechanisms of the rear wheels, in order to completely brake the baby carriage. The existing baby carriages have the following problems: firstly, in order to realize a complete braking of the baby carriage, the user has to use foot/feet to separately step on the brake mechanisms of the rear wheels, such way of braking is troublesome and not convenient enough; secondly, the phenomenon that the use steps only one of the brake mechanisms of the rear wheels on one side are often happen, so the baby carriage is not fully braked, resulting in the possibility that the baby carriage may slip, and there is a great safety problem.

Therefore, there is an urgent need for a baby carriage brake mechanism that is easy to operate and can brake both wheels at the same time, and a baby carriage having the baby carriage brake mechanism.

SUMMARY

The first object of the disclosure is to provide a baby carriage brake mechanism that is easy to operate and can brake both wheels at the same time.

The second object of the disclosure is to provide a baby carriage, the baby carriage has the baby carriage brake mechanism mentioned above, By such baby carriage brake mechanism can realizes simultaneous braking of the wheels on both sides, thereby improving simplicity of operating the brake of the baby carriage.

In order to achieve the above-mentioned first objective, the disclosure provides a baby carriage brake mechanism, which comprises a frame, brake drive assembly, two linkage assemblies, brake locks and wheels. The brake drive assembly is disposed on the frame, the two linkage assemblies are respectively slidably disposed on both left and right sides of the frame, both ends of the brake drive assembly are respectively in abutting connection with the two linkage assemblies, all the linkage assemblies are coupled to the brake locks, two of the wheels are pivotally disposed at both of left and right sides of the frame respectively, and the linkage assemblies may act together with the brake locks by the brake drive assembly driven to push, the brake locks on both sides are engaged with the wheels.

Compared with the related art, in the baby carriage brake mechanism of the disclosure, the linkage assemblies on both side slide by pushing of the brake drive assembly, so the linkage assemblies on both sides drive the brake locks on both to act, such that the brake locks on both sides are respectively engaged with the wheels on both sides and lock the wheels on both sides. Therefore, the baby carriage brake mechanism of the disclosure can brake the wheels on both sides at the same time, and the operation is simple and convenient.

Preferably, the brake drive assembly comprises a brake pedal and two drive members. The brake pedal is upward and downward slidably disposed on the frame. Both ends of the brake pedal are respectively in abutting connection with the two drive members. The drive members are leftward and rightward slidably disposed on the frame. The drive members are in abutting connection with the linkage assemblies. The two drive members may slide by the brake pedal driven to slide, such that the two drive members respectively drive the two linkage assemblies to act.

Preferably, first inclined surfaces are provided on both sides of the brake pedal, second inclined surfaces are provided at every ends of the drive members, and the first inclined surfaces are cooperatively coupled to the second inclined surfaces.

Preferably, the brake drive assembly further comprises an elastically deformable positioning member. The brake pedal has a first tracking slot and a second tracking slot. The first tracking slot is located below the second tracking slot. One end of the first tracking slot is in communication with one end of the second tracking slot. One end of the positioning member is fixed in the frame. By the brake pedal driven to slide, the other end of the positioning member may be alternately engaged at a lowest position of the first tracking slot and a lowest position of the second tracking slot.

Preferably, both the first tracking slot and the second tracking slot have a concave structure, both ends of the first tracking slot are respectively in communication with both ends of the second tracking slot.

Preferably, both of the first tracking slot and the second tracking slot are V-shaped.

Preferably, the brake drive assembly further comprises a first elastic resetting member for resetting the brake pedal. The first elastic resetting member is disposed between the brake pedal and the frame.

Preferably, the brake pedal has a first groove, and one end of the first elastic resetting member is inserted into the first groove.

Preferably, the frame has a second groove, and the other end of the first elastic resetting member is inserted into the second groove.

Preferably, each of the drive members along sliding direction has a first limiting slot, the frame has a first limiting shaft, and the first limiting shaft is slidably inserted into the first limiting slot.

Preferably, the brake drive assembly comprises a brake pedal and drive members. The brake pedal is fixedly connected to the drive members. The drive members is pivotally coupled to the frame. Both ends of the drive members are respectively in abutting connection with the two linkage assemblies. By the brake pedal driven to rotate together with the drive members, the drive members may act to push the linkage assemblies.

Preferably, the drive members comprise a driving body and two driving parts. The driving body is pivotally coupled to the frame. The two driving parts are respectively protruding at both ends of the driving body. The driving parts are in abutting connection with the linkage assemblies.

Preferably, the drive members are each provided with a dodging slot along its rotation direction.

Preferably, one of the brake pedal and the frame has at least two positioning slots, the other one of the brake pedal and the frame has a bump. By rotating of the brake pedal, the bump may be engaged with one of the positioning slots.

Preferably, each of the linkage assemblies comprises a pushing part and a pulling part. Both the pushing part and the pulling part are upward and downward slidably disposed in the frame. The pulling part is fixedly connected to the brake locks. The pushing part may slide by pushing of the brake drive assembly, such that the pushing part may push the pulling part to slide together with the brake locks.

Preferably, the brake drive assembly is provided with a third inclined surface, the pushing part is provided with a fourth inclined surface, and the third inclined surface is cooperatively coupled to the fourth inclined surface.

Preferably, the pushing part comprises a pushing member and a plug pin. The pushing member is upward and downward slidably disposed in the frame. One end of the plug pin is fixedly connected to the pushing member, and the other end of the plug pin is in abutting connection with the pulling part.

Preferably, the plug pin is located above the pulling part.

Preferably, the pushing member along it sliding direction is provided with a second limiting slot, the frame is provided with a second limiting shaft, and the second limiting shaft is slidably inserted into the second limiting slot.

Preferably, the pushing part comprises a first roller and a plug pin. The first roller is pivotally connected to the plug pin. The first roller is in abutting connection with the brake drive assembly. The plug pin is upward and downward slidably disposed in the frame, and the plug pin is in abutting connection with the pulling part.

Preferably, the linkage assemblies each further comprises a second elastic resetting member for resetting the pushing part. The second elastic resetting member is disposed between the pushing part and the frame.

Preferably, the pulling part comprises a first fixing member and a first traction member. The first fixing member is upward and downward slidably disposed in the frame. One end of the first traction member is fixedly connected to the first fixing member, and the other end of the first traction member is fixedly connected to the brake locks. By sliding of the first fixing member and pulling of the first traction member, the first traction member may pull the brake locks, such that the brake locks are engaged with the wheels.

Preferably, a middle portion of the first traction member has an inverted U-shaped structure and is supported on the frame, such that the first traction member moves by sliding down of the first fixing member.

Preferably, the pulling part further comprises a reversing member. The reversing member is fixed in the frame and located a side of the first fixing member. The inverted U-shaped structure of the first traction member is disposed to penetrate into the reversing member.

Preferably, the reversing member has a second roller pivotally connected thereto. The first traction member is wound on the second roller.

Preferably, the pulling part further comprises a second fixing member. The second fixing member is upward and downward slidably disposed in the frame. One end of the second fixing member is fixedly connected to the first traction member, and the other end of the second fixing member is fixedly connected to the brake locks.

Preferably, the pulling part further comprises a third elastic resetting member for resetting the second fixing member. The third elastic resetting member is disposed between the second fixing member and the frame.

Preferably, the first traction member is a steel wire.

Preferably, the wheels each along its rotation direction is provided with several engaging slots. The brake locks may be engaged with or disengaged from the engaging slots.

Preferably, the wheels each may comprise a wheel body and a wheel hub. The wheel body is pivotally connected to the frame. The wheel hub is sleeved on the wheel body. The engaging slots are disposed on the wheel hub.

In order to achieve the above-mentioned second objective, the disclosure provides a baby carriage, which comprises a seat part, and further comprises the baby carriage brake mechanism mentioned above with a seat part disposed on the frame.

Compared with the related art, since the baby carriage of the disclosure is provided with the baby carriage brake mechanism, by driving the brake drive assembly to push the linkage assemblies on both sides to slide, the linkage assemblies on both sides may drive the brake locks on both to act, such that the brake locks on both sides are respectively engaged with the wheels on both sides and lock the wheels on both sides. Therefore, the baby carriage of the disclosure can brake the wheels on both sides at the same time by operating the baby carriage brake mechanism, and has the characteristics of simple operation.

Preferably, the frame comprises a frame body and two rotating parts. The two rotating parts are pivotally connected to both sides of the frame body respectively, and the wheels are pivotally connected to the rotating parts.

Preferably, the baby carriage of the disclosure further comprises a push and drift operating part and rotation orientation assemblies. The push and drift operating part is disposed on the frame body, one end of the rotation orientation assemblies is coupled to the push and drift operating part, and the other end of the rotation orientation assemblies is engaged between the frame body and the rotating parts. By operation of the push and drift operating part, the rotation orientation assemblies may be disengaged from the rotating parts.

Preferably, the rotation orientation assemblies each comprises a second traction member and a orienting member. The push and drift operating part is connected to one end of the second traction member and can pull the second traction member, and the other end of the second traction member is coupled to the orienting member. The orienting member is engaged between the frame body and the rotating parts.

Preferably, the rotation orientation assemblies each further comprises a fourth elastic resetting member for resetting the orienting member. The fourth elastic resetting member is disposed between the orienting member and the frame body.

Preferably, the second traction member is a steel wire.

BRIEF DESCRIPTION OF THE DRAWINGS

FIG. 6 is a schematic structural view of the baby carriage brake mechanism of the first embodiment of the disclosure brake pedal before being stepped on.

FIG. 7 is a schematic structural view of the baby carriage brake mechanism of the first embodiment of the disclosure brake pedal after being stepped on.

DETAILED DESCRIPTION

In order to describe the technical content and structural features of the disclosure in detail, the following illustration is provided conjunction with the embodiments and the accompanying drawings.

Figure 1:
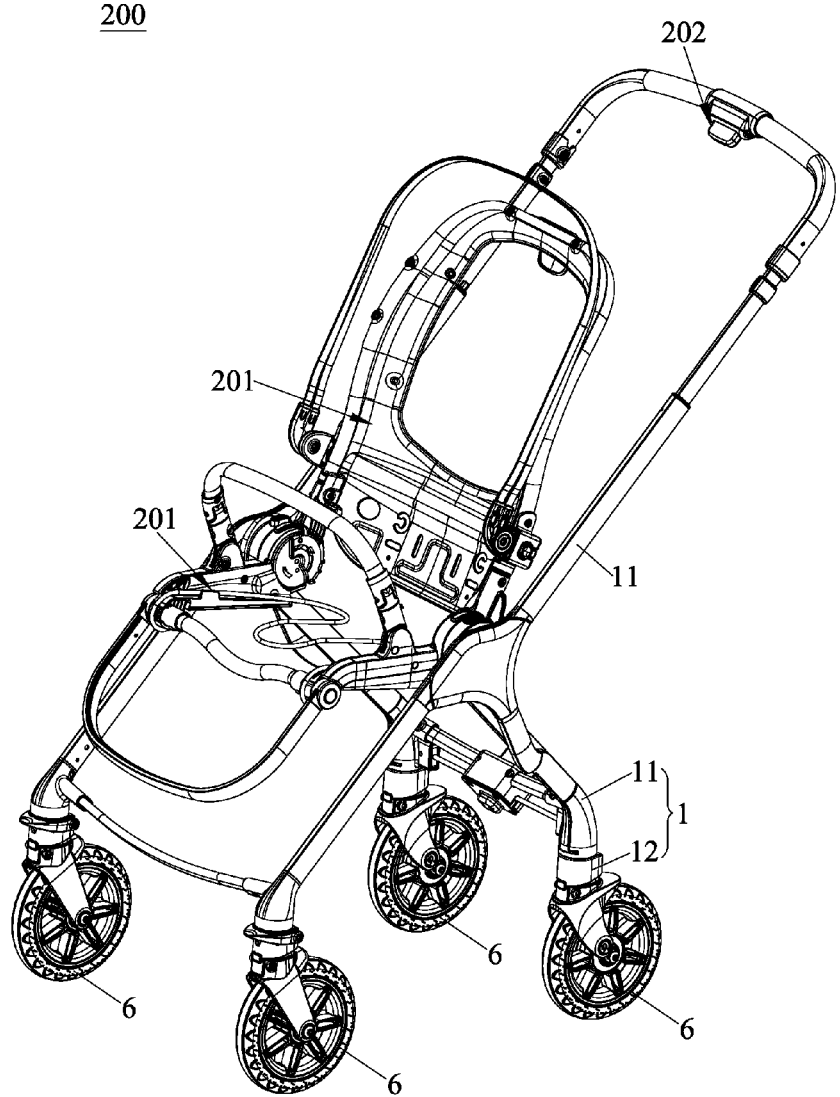
FIG. 1 is a schematic perspective structural view of the baby carriage of a first embodiment of the disclosure.
Figure 2:
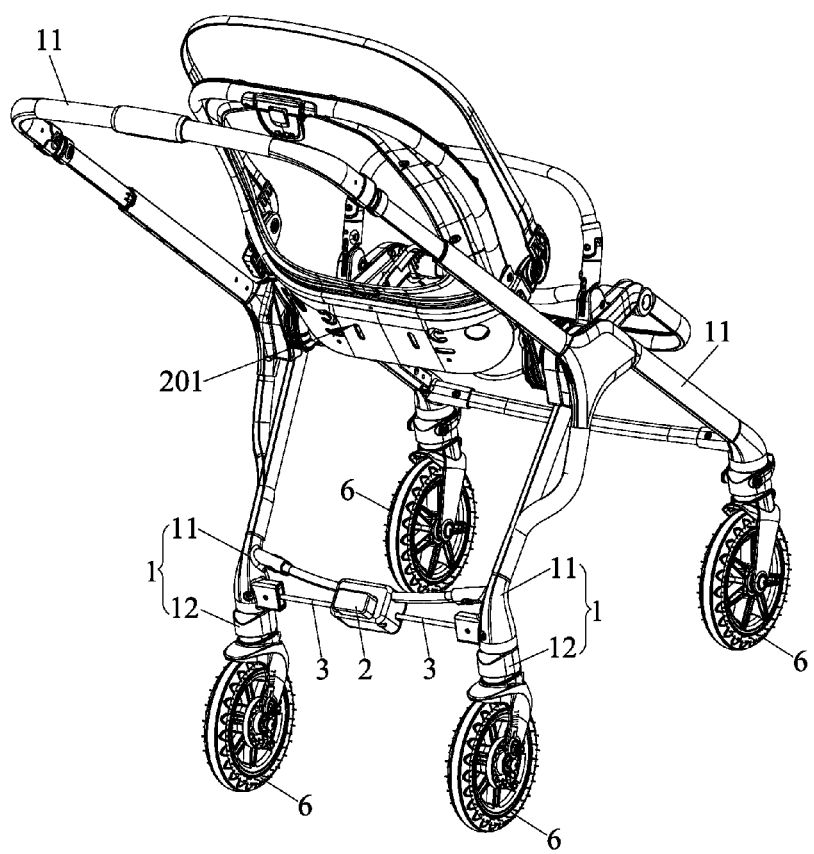
FIG. 2 is a schematic perspective structural view of the baby carriage of a first embodiment of the disclosure in another angle.
Figure 3:
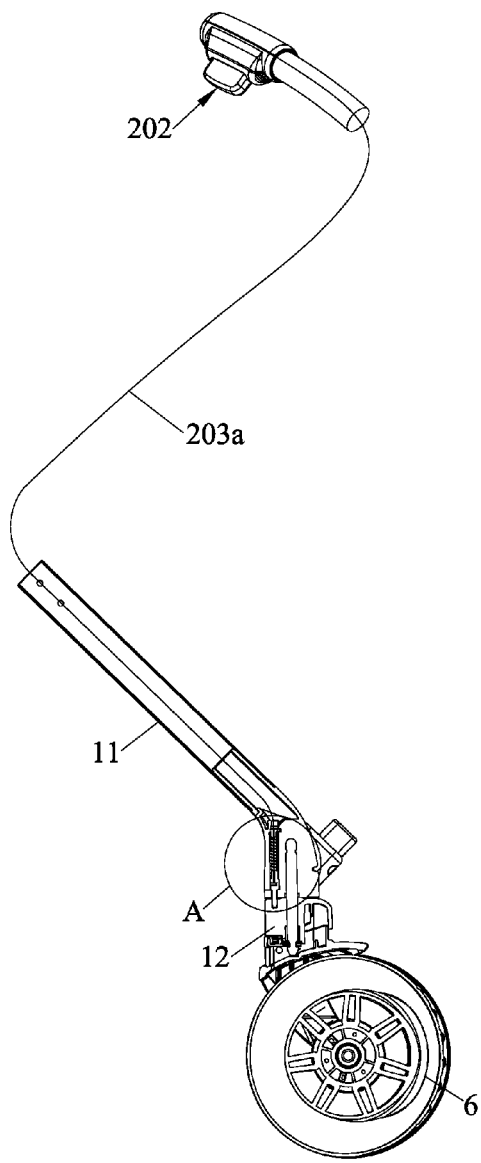
FIG. 3 is a schematic structural view of the push and drift operating part and the rotation orientation assemblies of the disclosure.
Figure 4:
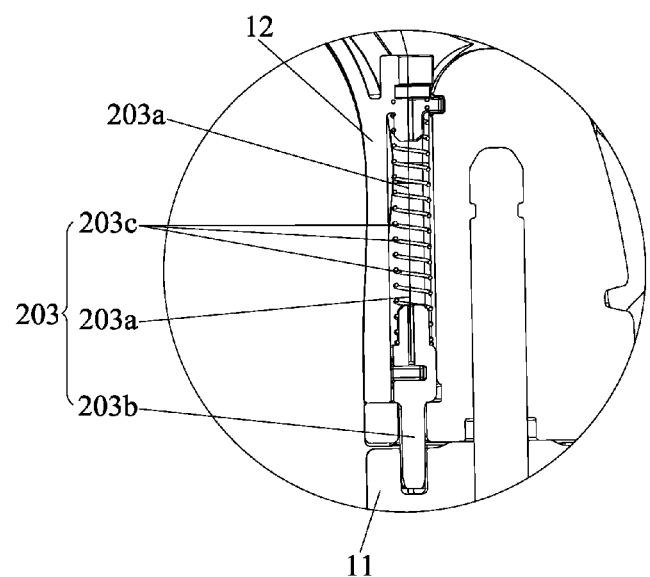
FIG. 4 is an enlarged view of A in FIG. 3.
Figure 5:
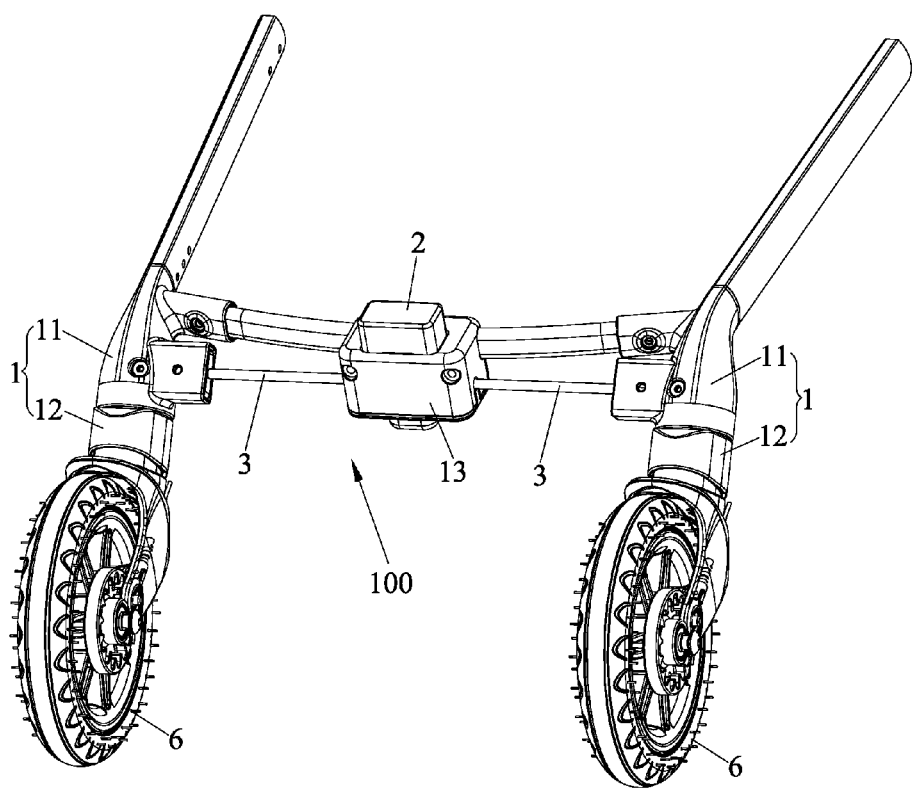
FIG. 5 is a schematic structural view of the baby carriage brake mechanism of the first embodiment of the disclosure.

Referring to FIGS. 1, 2 and 5, the baby carriage 200 of the disclosure comprises a seat part 201 and a baby carriage brake mechanism 100.

Figure 12:
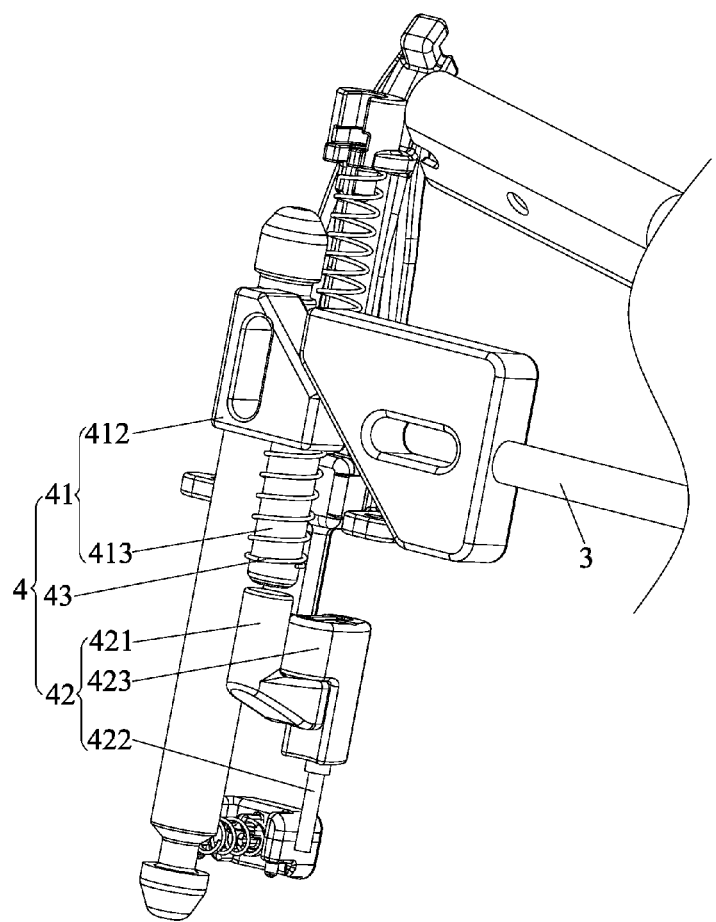
FIG. 12 is a schematic perspective structural view of the linkage assembly on one side of the baby carriage brake mechanism of the first embodiment of the disclosure.
Figure 13:
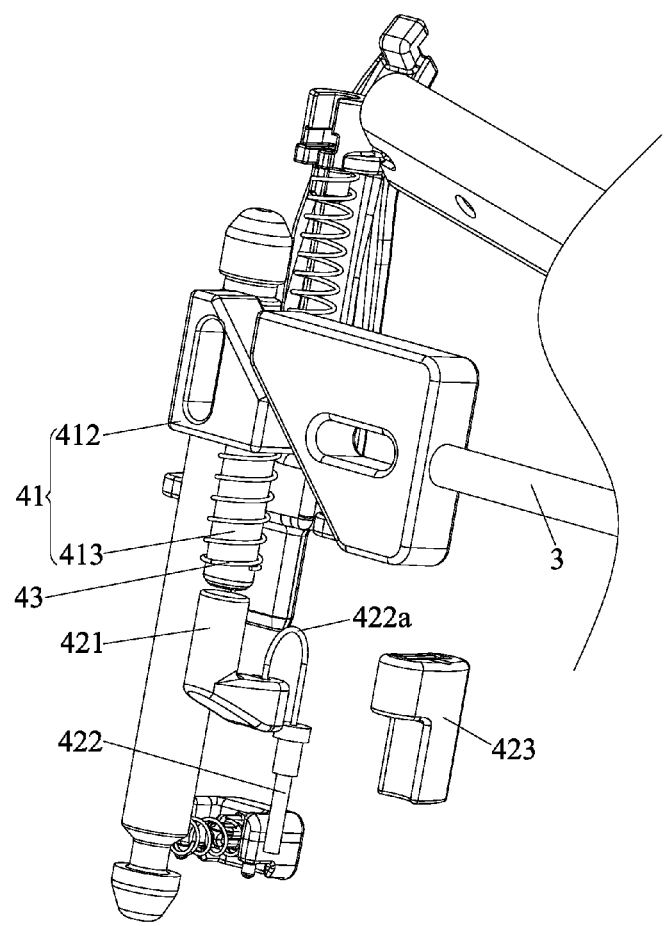
FIG. 13 is a schematic view of the structure after the reversing member in FIG. 12 being removed.
Figure 14:
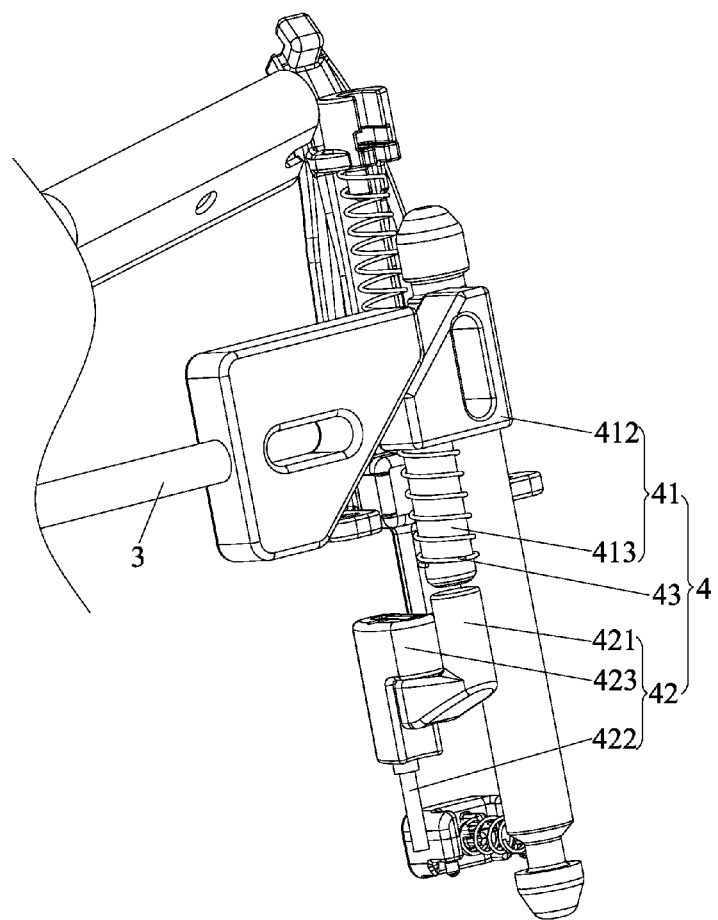
FIG. 14 is a schematic perspective structural view of the linkage assembly on the other side of the baby carriage brake mechanism of the first embodiment of the disclosure.
Figure 15:
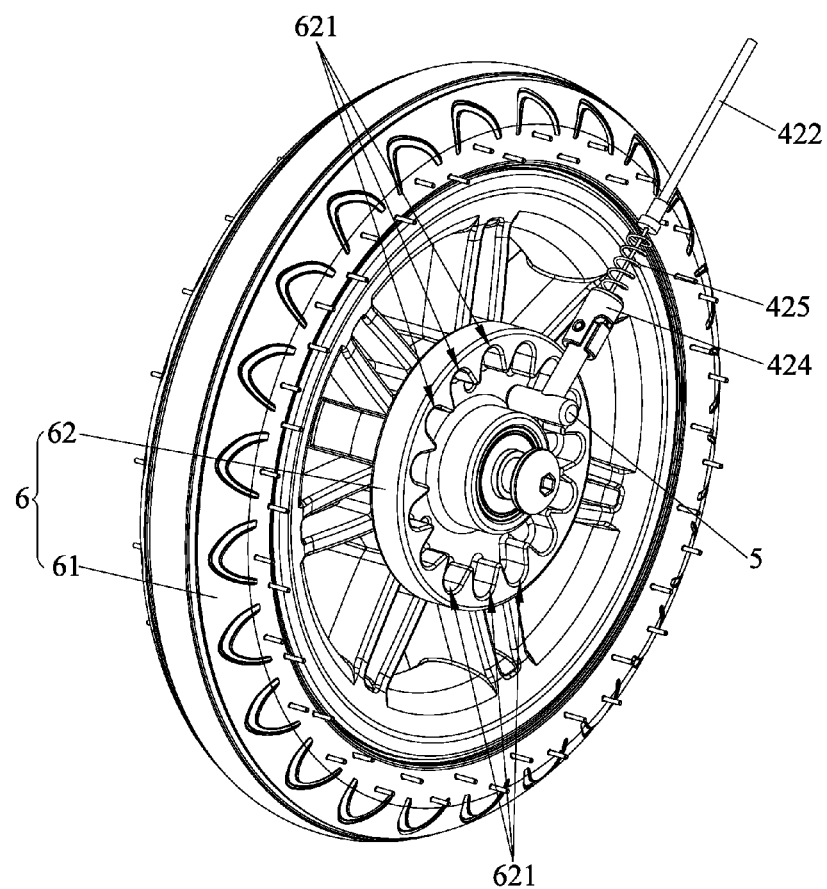
FIG. 15 is a schematic structural view of the linkage assembly, the brake lock and the wheel of the baby carriage brake mechanism of the first embodiment of the disclosure.

Referring to FIGS. 5, 12 and 15, in a first embodiment of the baby carriage brake mechanism 100, the baby carriage brake mechanism 100 comprises a frame 1, a brake drive assembly, two linkage assemblies 4, brake locks 5 and wheels 6. The brake drive assembly is disposed on the frame 1. The two linkage assemblies 4 are slidably disposed on both of left and right sides of the frame 1 respectively. Both ends of the brake drive assembly are respectively in abutting connection with the two linkage assemblies 4. The linkage assemblies 4 are coupled to the brake locks 5. Two of the wheels 6 are respectively pivotally disposed at both of left and right sides of the frame 1. By driving the brake drive assembly to push the linkage assemblies 4 to act together with the brake locks 5, the brake locks 5 on both sides may be engaged with the wheels 6, such that the wheels on both sides may be braked at the same time. The seat part 201 disposed on the frame 1 is suitable for baby to sit. Moreover, the brake drive assembly comprises a brake pedal 2 and drive members 3. The brake pedal 2 is upward and downward slidably disposed at a middle of the frame 1. Specifically, the brake pedal 2 is upward and downward slidably disposed on mounting member 13 of the frame 1. The linkage assemblies 4 are upward and downward slidably disposed on the frame 1. Both ends of the brake pedal 2 are respectively in abutting connection with the two drive members 3. The drive members 3 are leftward and rightward slidably disposed on the frame 1. The drive members 3 are in abutting connection with the linkage assemblies 4. Specifically, one end of each of the drive members 3 is leftward and rightward slidably disposed in the mounting members 13. Each of the drive members 3 has a first limiting slot 32 along sliding direction, and a first limiting shaft 112 is disposed on the frame 1. The first limiting shaft 112 is slidably inserted into the first limiting slot 32, that is, the first limiting shaft 112 and the first limiting slot 32 of the drive members 3 may slide in respect to each other, and the first limiting shaft 112 can play a limiting role, but the disclosure is not limited to this. By driving the brake pedal 2 to slide, the two drive members 3 may be pushed to slide, such that the two drive members 3 respectively push the two linkage assemblies 4 to act; and in turn, the action of the two linkage assemblies 4 may drive the brake locks 5 on both sides to move, such that the brake locks 5 on both sides are engaged with the wheels 6, thereby simultaneously stopping/braking the wheels on both sides.

Figure 8:
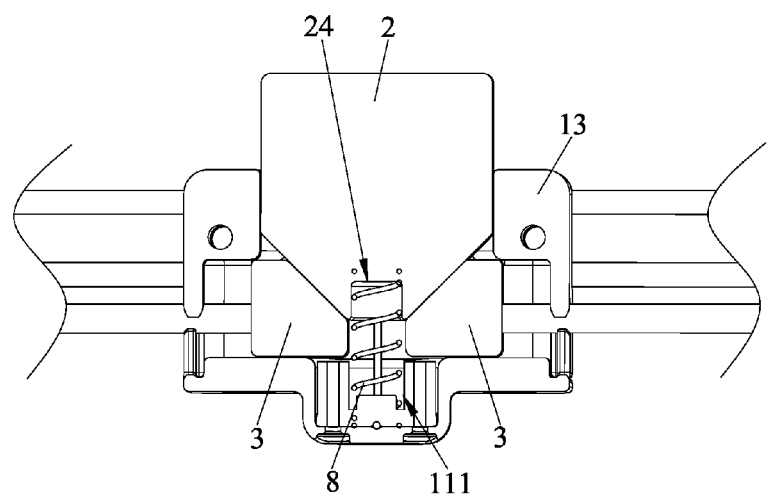
FIG. 8 is a schematic view of an inner structure of the brake pedal of the baby carriage brake mechanism of the first embodiment of the disclosure.
Figure 9:
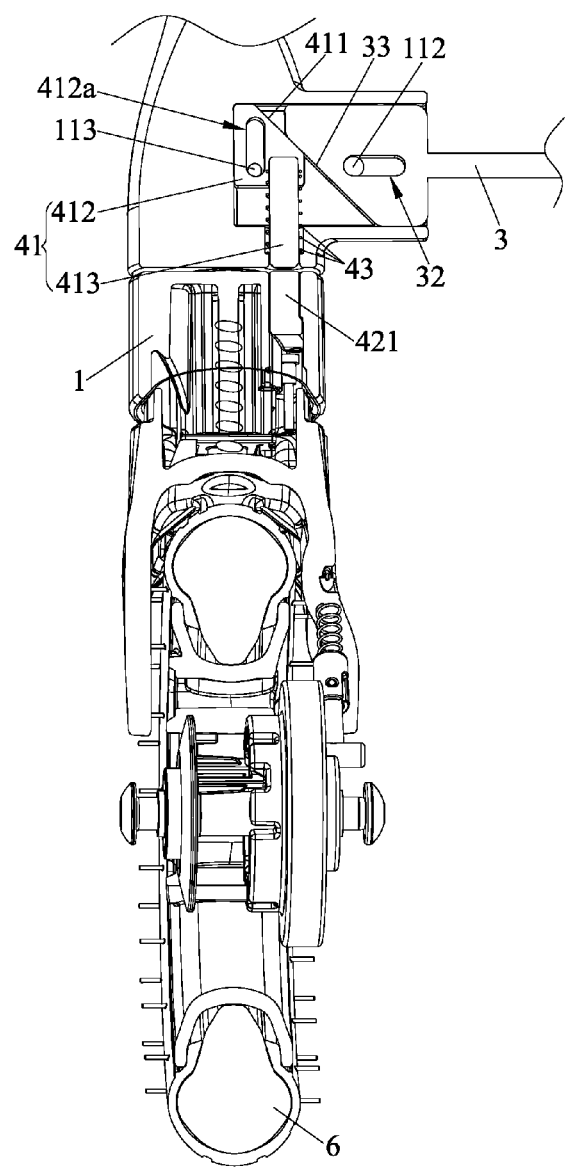
FIG. 9 is a schematic view of a structure between the drive member and the linkage assembly on one side the baby carriage brake mechanism of the first embodiment of the disclosure.
Figure 10:
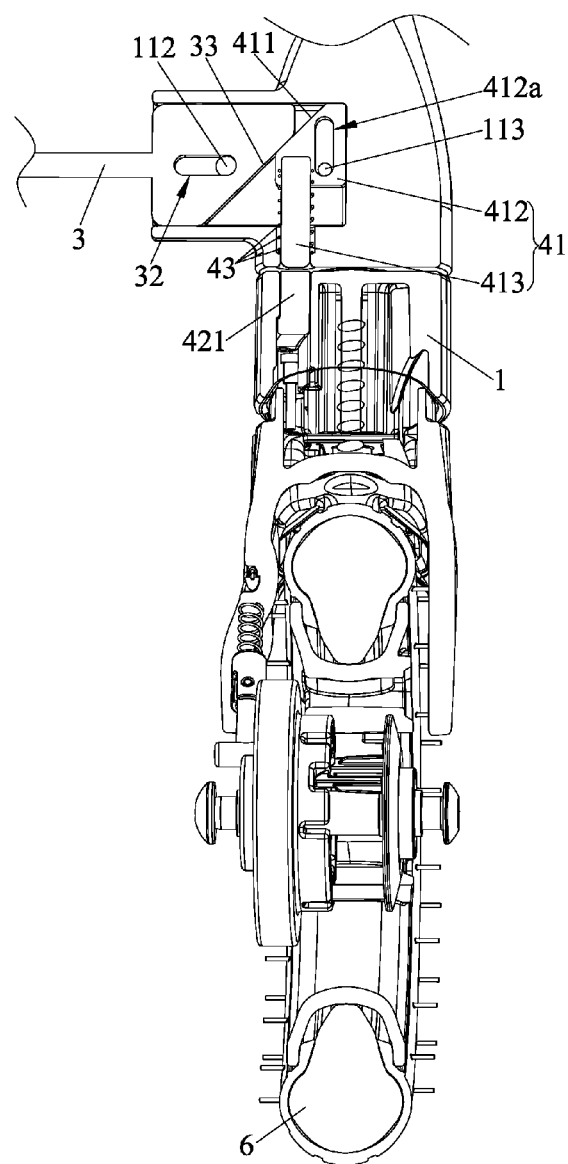
FIG. 10 is a schematic view of a structure between the drive member and the linkage assembly on the other side of the baby carriage brake mechanism of the first embodiment of the disclosure.
Figure 11:
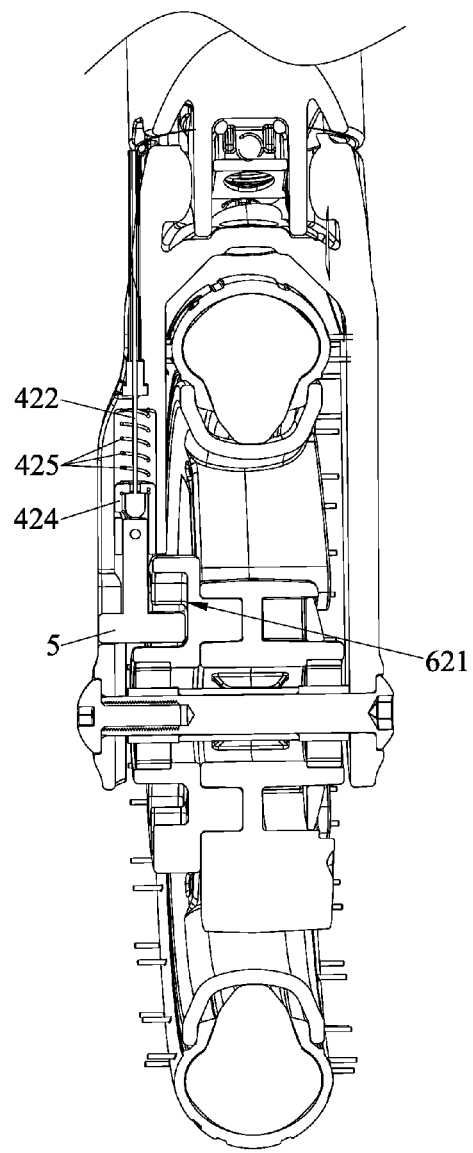
FIG. 11 is a schematic view of a structure between the linkage assemblies and the brake locks of the baby carriage brake mechanism of the first embodiment of the disclosure.

Referring to FIGS. 5 and 8, in this embodiment, the brake pedal 2 is located above the two drive members 3. The brake pedal 2 has first inclined surfaces 21 on both sides. One end of each of the drive members 3 has a second inclined surface 31. The first inclined surfaces 21 are cooperatively coupled to the second inclined surfaces 31. Under a cooperative action of the first inclined surfaces 21 and the second inclined surfaces 31, by driving the brake pedal 2 to slide down, the brake pedal 2 may push the drive members 3 to respectively slide toward both of left and right sides. But the disclosure is not limited thereto. For example, an existing chute drive maybe used between the brake pedal 2 and the drive members 3. Specifically, the brake drive assembly may further comprise a first elastic resetting member 8 for resetting the brake pedal 2. The first elastic resetting member 8 is disposed between the brake pedal 2 and the frame 1. When the brake pedal 2 is driven to slide down, the brake pedal 2 may compress the first elastic resetting member 8. When the brake pedal 2 is free/unconstrained, the brake pedal 2 may slide up and be reset under action of the first elastic resetting member 8. Specifically, the brake pedal 2 has a first groove 24, and one end of the first elastic resetting member 8 is inserted into the first groove 24; moreover, the frame 1 has a second groove 111 therein, and the other end of the first elastic resetting member 8 is inserted into the second groove 111. Positioning of the first elastic resetting member 8 may be performed by the first groove 24 and the second groove 111. But the disclosure is not limited thereto.

Figure 6:
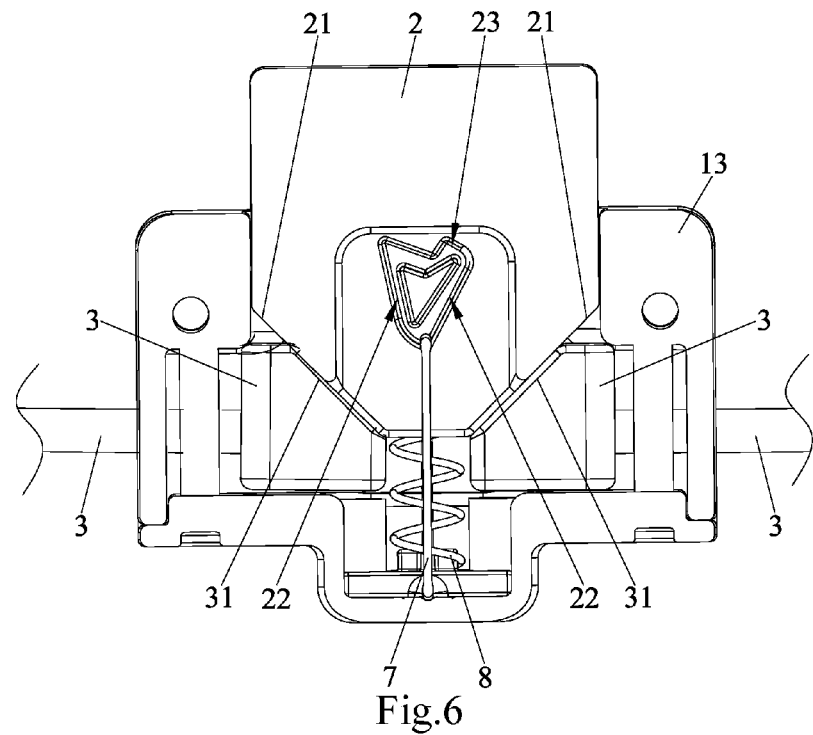
Figure 7:
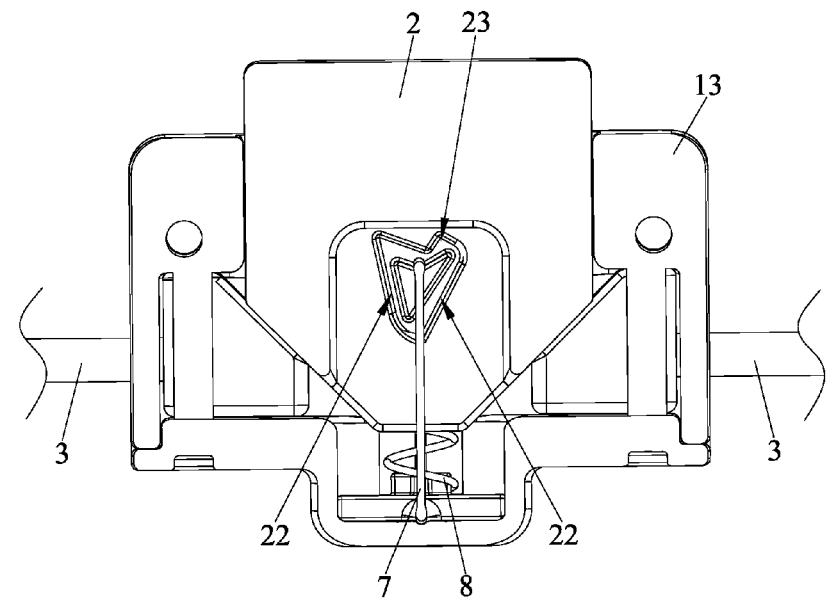

Referring to FIGS. 5-7, in this embodiment, the brake drive assembly may further comprise an elastically deformable positioning member 7. The brake pedal 2 may have a first tracking slot 22 and a second tracking slot 23. The first tracking slot 22 is located below the second tracking slot 23. One end of the first tracking slot 22 is in communication with one end of the second tracking slot 23. One end of the positioning member 7 is fixed in the frame 1. By driving the brake pedal 2 to slide, the other end of the positioning member 7 may be alternately engaged at a lowest position of the first tracking slot 22 and a lowest position of the second tracking slot 23. Specifically, both of the first tracking slot 22 and the second tracking slot 23 have a concave structure, and both ends of the first tracking slot 22 are respectively in communication with both ends of the second tracking slot 23, such that the first tracking slot 22 and the second tracking slot 23 form a closed track. Moreover, both of the first tracking slot 22 and the second tracking slot 23 are V-shaped. But the disclosure is not limited thereto. For example, the first tracking slot 22 and the second tracking slot 23 may also be U-shaped, or may be obliquely upward long slots. Initially, as shown in FIG. 6, the other end of the positioning member 7 is engaged at a lowest position of the first tracking slot 22 (i.e., a middle of the first tracking slot 22). After the brake pedal 2 is stepped on to slide, the other end of the positioning member 7 may slide from the track on the side of the first tracking slot 22 to the side of the second tracking slot 23, and slide to a lowest position of the second tracking slot 23 by its own elastic restoring force (i.e., a middle of the second tracking slot 23), as shown in FIG. 7, in order to realize positioning of the brake pedal 2, such that the two drive members 3 may respectively drive the two linkage assemblies 4 to act together with the two brake locks 5, and then the brake locks 5 on both sides remain engaged with the wheels 6, thereby keeping the brake pedal 2 locked to the wheels 6. When the brake pedal 2 is stepped on again to slide down, the other end of the positioning member 7 may slide along the track on the other side of the second tracking slot 23, and under the elastic restoring force of the positioning member 7 its own the cooperation of the first elastic resetting member 8 pushing the brake pedal 2 to be reset, the positioning member 7 may slide form the second tracking slot 23 to a lowest position of the first tracking slot 22 as shown in FIG. 6, so as to realize resetting of the brake pedal 2; then the brake pedal 2 would no longer to drive the drive members 3 to slide, drive members 3, the linkage assemblies 4 and the brake locks 5 are reset, and the brake locks 5 disengaged from the wheels 6, thereby keep the cooperation of the brake pedal 2 to the wheels 6.

Referring to FIGS. 9-14, the linkage assemblies 4 each may comprises a pushing part 41 and a pulling part 42. The pushing part 41 may be upward and downward slidably disposed in the frame 1. The pulling part 42 may be upward and downward slidably disposed in the frame 1. The pulling part 42 is fixedly connected to the brake locks 5. By sliding of the drive members 3 of the brake drive assembly, the pushing part 41 may be pushed to slide, such that the pushing part 41 may push the pulling part 42 to slide together with the brake locks 5. Specifically, each of the drive members 3 of the brake drive assembly may have a third inclined surface 33, and the pushing part 41 may have a fourth inclined surface 411. The third inclined surface 33 of the drive members 3 may be located above the fourth inclined surface 411 of the pushing part 41, and the third inclined surface 33 is cooperatively coupled to the fourth inclined surface 411. More specifically, the pushing part 41 is located above the pulling part 42, and the pushing part 41 may slide down and push the pulling part 42 to slide. By driving the drive members 3 to slide respectively toward both of left and right sides, under cooperative action of the third inclined surfaces 33 and the fourth inclined surfaces 411, the drive members 3 may push the pushing part 41 to slide down, and sliding down of the pushing part 41 may push the pulling part 42 to slide together with the brake locks 5, so the brake locks 5 on both sides are engaged with the wheels 6, thereby locking the wheels 6 on both sides. But the disclosure is not limited thereto. For example, an existing chute drive maybe used between the drive members 3 and the pushing part 41, or the third inclined surfaces 33 of the drive members 3 may be located below the fourth inclined surfaces 411 of the pushing parts 41. By the drive members 3 driving the pushing part 41 to slide, the pushing part 41 may push up the pulling part 42 to slide up, such that the pulling part 42 pulls the brake locks 5 and engages the brake locks 5 with the wheels 6.

Continuously referring to FIGS. 9-14, in this embodiment, the pushing part 41 comprises the pushing member 412 and the plug pin 413. The pushing member 412 is upward and downward slidably disposed in the frame 1. One end of the plug pin 413 is fixedly connected to the pushing member 412, and the other end of the plug pin 413 is in abutting connection with the pulling part 42. The plug pin 413 is located above the pulling part 42. Specifically, the pushing member 412 has a second limiting slot 412a along its sliding direction, the frame 1 has a second limiting shaft 113, and the second limiting shaft 113 may be slidably inserted into the second limiting slot 412a, i.e., the second limiting shaft 113 and the second limiting slot 412a of the pushing member 412 may slide in respect to each other, and the second limiting shaft 113 can play a limiting role. But the disclosure is not limited thereto. Furthermore, the linkage assemblies 4 each may further comprises a second elastic resetting member 43 for resetting the pushing part 41, the second elastic resetting member 43 is disposed between the pushing part 41 and the frame 1. More specifically, the second elastic resetting member 43 is sleeved on the plug pin 413. But the disclosure is not limited thereto. Moreover, an existing elastic member such as a compression spring may be used for the second elastic resetting member 43.

Please continue to refer to FIGS. 9-14, in this embodiment, the pulling part 42 comprises the first fixing member 421 and the first traction member 422. The first fixing member 421 is upward and downward slidably disposed in the frame 1 and located below the pushing part 41. One end of the first traction member 422 is fixedly connected to the first fixing member 421, and the other end of the first traction member 42 is fixedly connected to the brake locks 5. A middle portion of the first traction member 422 has an inverted U-shaped structure 422a and is supported on the frame 1. By the first fixing member 421 sliding down and pulling the first traction member 422, the first traction member 422 may pull the brake locks 5 up, such that the brake locks 5 are engaged with the wheels 6. By the plug pin 413 of the pushing part 41 pushing the first fixing member 421 to slide down, the first fixing member 421 may pull one end of the first traction member 422 to slide down. Since the middle portion of the first traction member 422 has an inverted U-shaped structure 422a and is supported on the frame 1, the other end of the first traction member 422 may rise and pull the brake locks 5, such that the brake locks 5 rise and are engaged with the wheels 6, thereby locking the wheels 6. Specifically, the pulling part 42 may further comprise a reversing member 423. The reversing member 423 is fixed in the frame 1 and located on a side of the first fixing member 421. The inverted U-shaped structure 422a of the first traction member 422 is disposed to penetrate into the reversing member 423 and is supported in the reversing member 423. More specifically, the pulling part 42 may further comprise a second fixing member 424. The second fixing member 424 is upward and downward slidably disposed in the frame 1. One end of the second fixing member 424 is fixedly connected to the first traction member 422, and the other end of the second fixing member 424 is fixedly connected to the brake locks 5. But the disclosure is not limited thereto. For example, the first traction member 422 may be fixedly connected to the brake locks 5. Moreover, an existing steel wire may be used for the first traction member 422. But the disclosure is not limited thereto, and an existing rope or the like may be used for the first traction member 422. Furthermore, the pulling part 42 may further comprise a third elastic resetting member 425 for resetting the second fixing member 424. The third elastic resetting member 425 is disposed between the second fixing member 424 and the frame 1. When the first traction member 422 pulls the second fixing member 424 to slide up, the second fixing member 424 compresses the third elastic resetting member 425. When the second fixing member 424 is released, the second fixing member 424 may slide down and is reset under action of the elastic restoring force of the third elastic resetting member 425, so as to drive the brake locks 5 to slide and are reset, and the brake locks 5 are disengaged from the wheels 6.

Referring to FIG. 15, the wheel 6 along its rotation direction has several engaging slots 621. The brake lock 5 may be engaged with or disengaged from the engaging slots 621. In this embodiment, the wheel 6 comprises a wheel body 61 and a wheel hub 62. The wheel body 61 is pivotally connected to the frame 1. The wheel hub 62 is sleeved on the wheel body 61, and the engaging slots 621 are disposed on the wheel hub 62. But the disclosure is not limited thereto.

Referring to FIGS. 5-15, the specific working principle of the baby carriage brake mechanism of the first embodiment of the disclosure 100 will be provided as follows.

When the wheels 6 need to be braked, the brake pedal 2 may be stepped on, which causes the positioning member 7 to slide from a lowest position of the first tracking slot 22 to a lowest position of the second tracking slot 23, and the brake pedal 2 is positioned. During the process, the brake pedal 2 pushes the drive members 3 on both sides, such that the drive members 3 slide respectively toward both of left and right sides. The sliding of the drive members 3 may push the pushing members 412 of the linkage assemblies 4 to slide down together with the plug pins 413, such that the plug pins 413 push the first fixing members 421 to slide down, and cause one ends of the first traction member 422 down. Meanwhile, the other ends of the first traction members 422 rise, such that the first traction members 422 pull the second fixing members 424 to slide up together with the brake locks 5, thereby making the brake locks 5 engaged with the engaging slots 621 of the wheels 6, and locking the wheels 6 on both sides. Accordingly, both of the rear wheels of the baby carriage 200 can be braked by a single stepping, and facility of braking operations of the baby carriage 200 is improved.

When the wheels 6 need to be unlocked, the brake pedal 2 may be stepped again, which causes the positioning member 7 to slide from the lowest position of the second tracking slot 23 to the lowest position of the first tracking slot 22, and the brake pedal 2 is reset to slide up under action of the first elastic resetting member 8. At this time, the entire linkage assemblies 4 may be reset under action of the second elastic resetting members 43 and the third elastic resetting members 425, and the brake locks 5 are driven to be reset, such that the brake locks 5 are disengaged from the wheels 6, thereby unlocking the wheels 6 on both sides.

Figure 16:
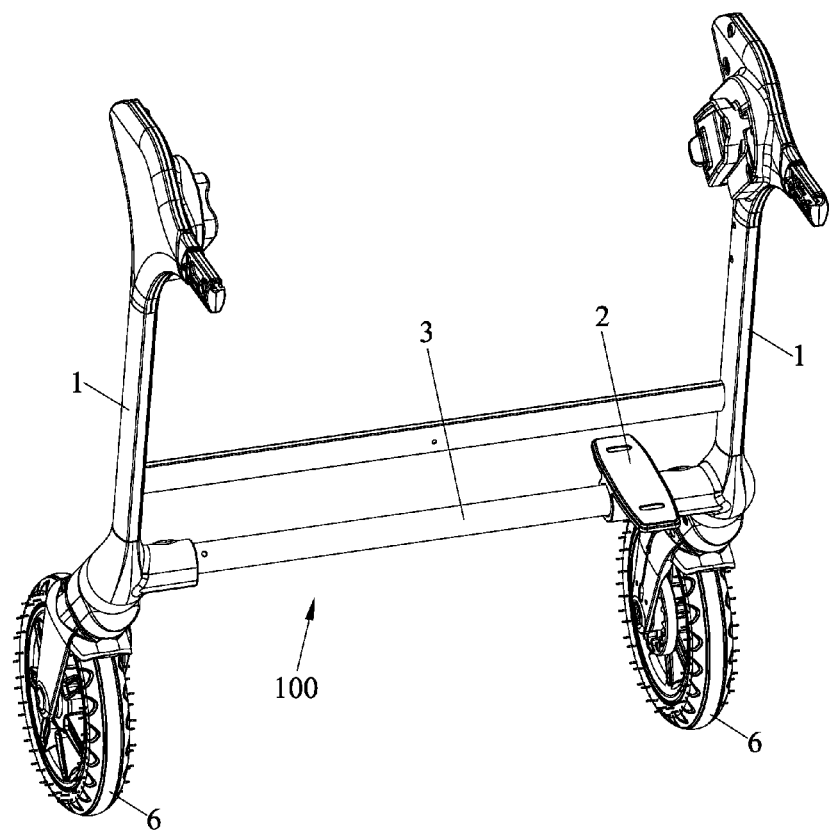
FIG. 16 is a schematic structural view of the second embodiment of the baby carriage of the disclosure.
Figure 22:
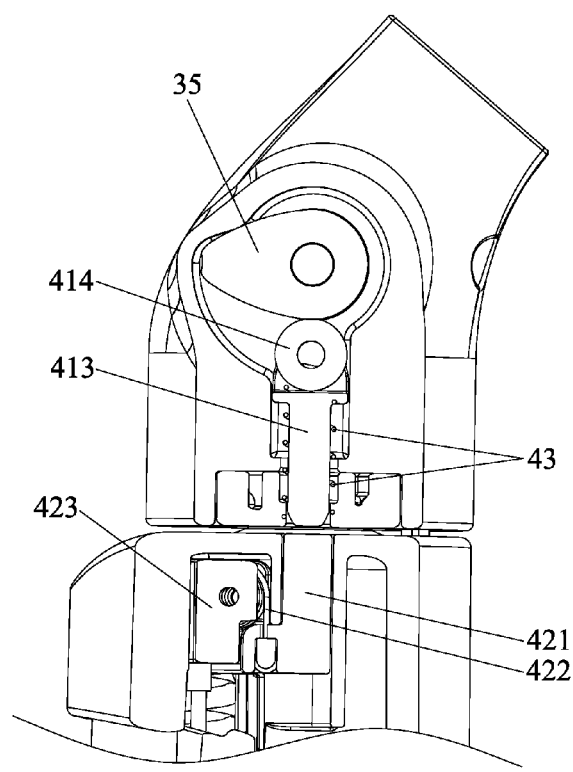
FIG. 22 is a schematic structural view of the brake drive assembly before pushing the linkage assembly of the second embodiment of the disclosure.
Figure 23:
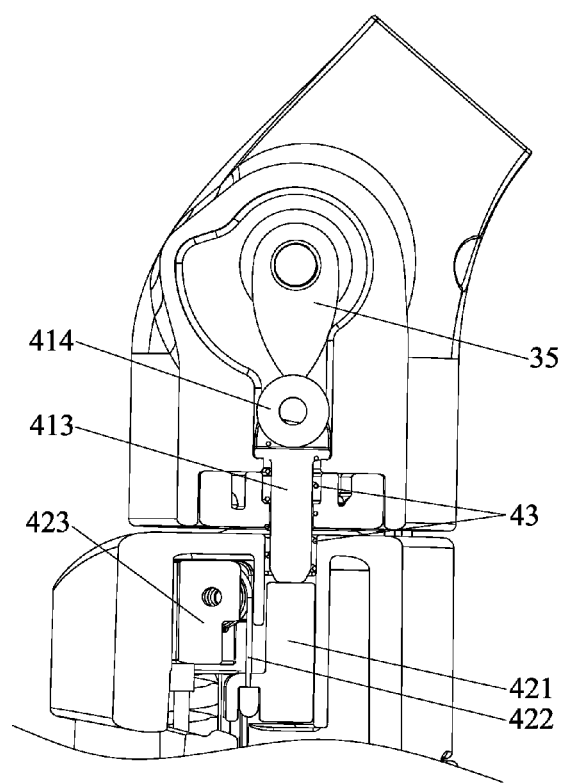
FIG. 23 is a schematic structural view of the brake drive assembly after pushing the linkage assembly of the second embodiment of the disclosure.
Figure 24:
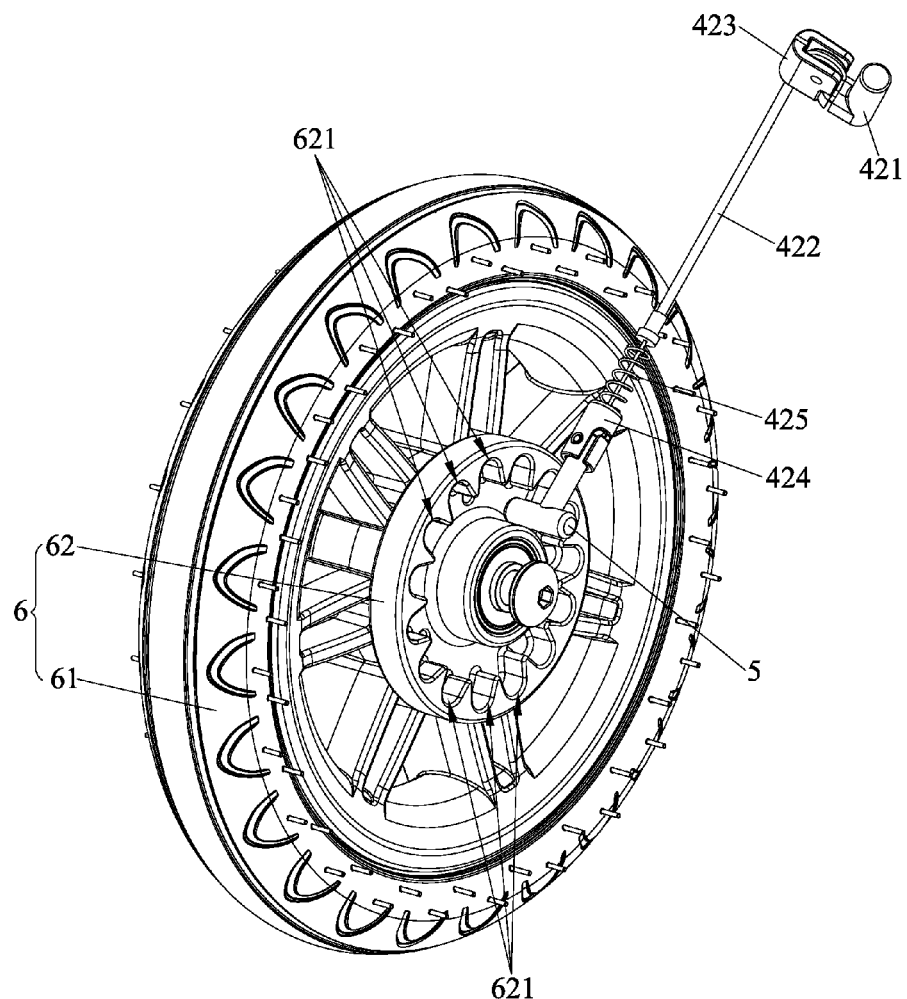
FIG. 24 is a schematic structural view of the linkage assembly, the brake lock and the wheel of the second embodiment of the disclosure.

Referring to FIGS. 16, 22 and 24, in the second embodiment, the baby carriage brake mechanism 100 comprises a frame 1, a brake drive assembly, two linkage assemblies 4, brake locks 5, and wheels 6. The brake drive assembly is disposed on the frame 1, the two linkage assemblies 4 are respectively slidably disposed on both of left and right sides of the frame 1. Both ends of the brake drive assembly are respectively in abutting connection with the two linkage assemblies 4. Both the linkage assemblies 4 are coupled to the brake locks 5. Two wheels 6 are pivotally disposed at both of left and right sides of the frame 1 respectively. By driving the brake drive assembly to drive the linkage assemblies 4 to act together with the brake locks 5, the brake locks 5 on both sides may be engaged with wheels 6, so the wheels on both sides can be braked at the same time. A seat part 201 is disposed on the frame 1. The seat part 201 serves for infant to sit. Moreover, the brake drive assembly comprises a brake pedal 2 and a drive member 3. The brake pedal 2 is fixedly connected to the drive member 3. The drive member 3 is pivotally connected to the frame 1. Both ends of the drive member 3 are respectively in abutting connection with the two linkage assemblies 4. By driving the brake pedal 2 to rotate together with the drive member 3, the drive member 3 may push the linkage assemblies 4 to act. At least one of wheels 6 has several engaging slots 621 along its rotation direction, and brake locks 5 may be engaged with or disengaged from the engaging slots 621.

Figure 17:
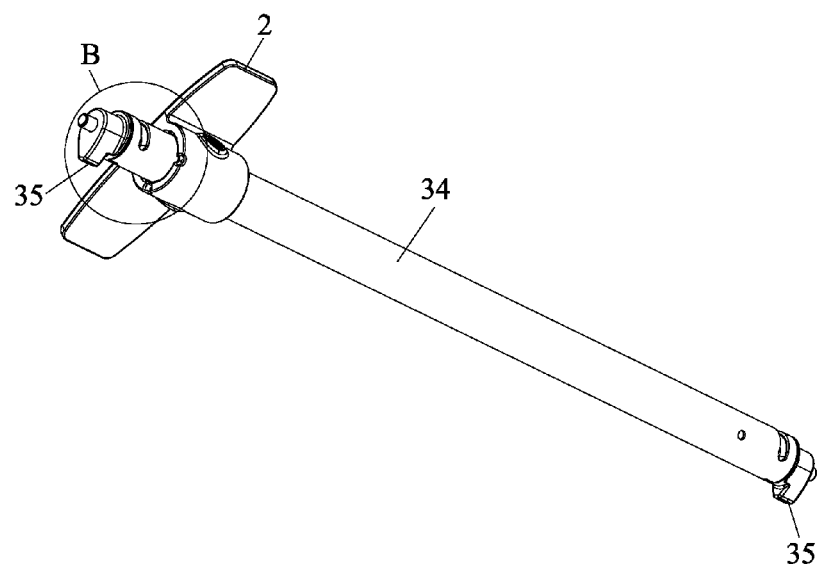
FIG. 17 is a schematic structural view of the brake drive assembly of the second embodiment of the disclosure.
Figure 18:
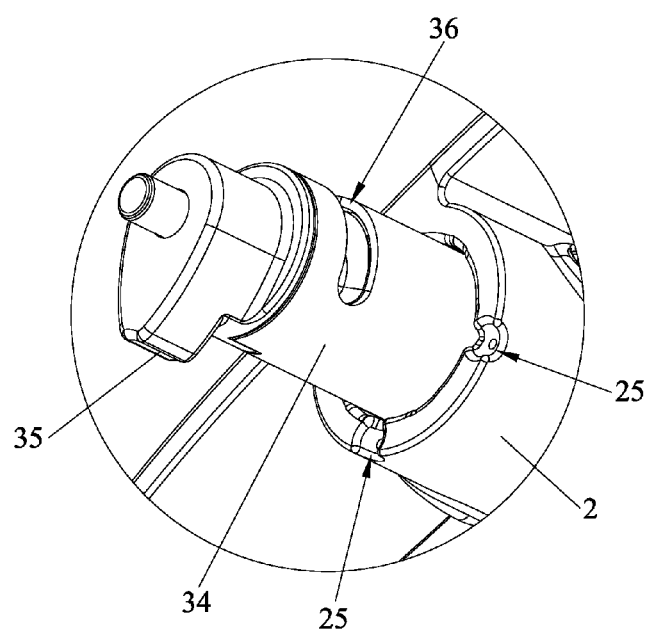
FIG. 18 is an enlarged view of B in FIG. 17.

Referring to FIGS. 16-18, the drive member 3 comprises a driving body 34 and driving parts 35. The driving body 34 is pivotally coupled to the frame 1, and the driving parts 35 are respectively protruding at both ends of the driving body 34. The driving parts 35 are in abutting connection with the linkage assemblies 4. The linkage assemblies 4 are located below the driving parts 35. By driving the drive members 3 to rotate, the driving parts 35 may rotate and cause the linkage assemblies 4 to slide down, so as to drive the brake locks 5 to move. Accordingly, the brake locks 5 on both are engaged with the wheels 6. Specifically, the drive member 3 has a dodging slot 36 along its rotation direction, which is used for dodging the protrusions in the frame 1., as well as limit the rotation of the driving member 3.

Figure 19:
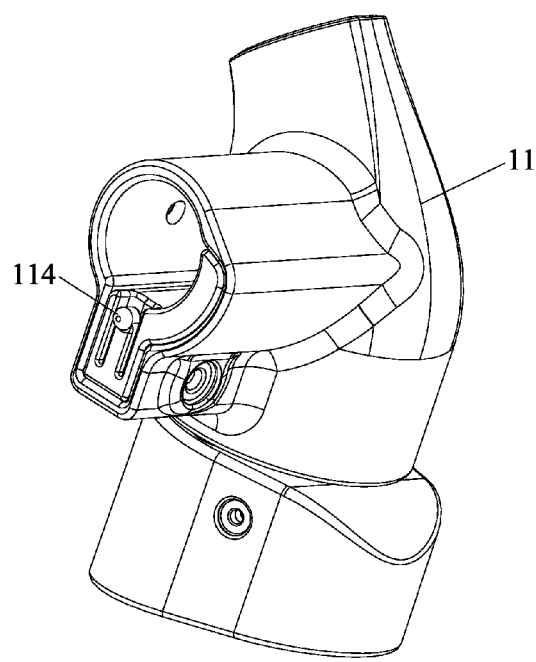
FIG. 19 is a schematic partial structural view of the frame body of the second embodiment of the disclosure.
Figure 20:
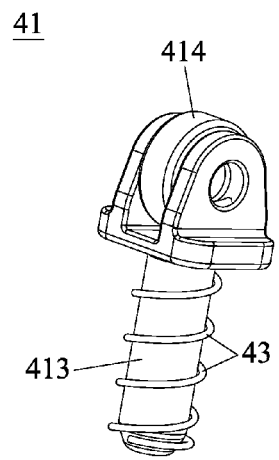
FIG. 20 is a schematic structural view of the pushing part of the linkage assembly of the second embodiment of the disclosure.
Figure 21:
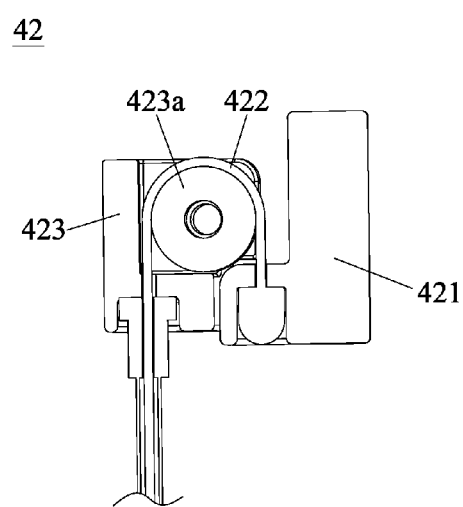
FIG. 21 is a schematic cross-sectional structural view of the pulling part of the linkage assembly of the second embodiment of the disclosure.

Referring to FIGS. 18 and 19, the brake pedal 2 has, but not limited to, two positioning slots 25. In other embodiments, the number of the positioning slots 25 may be three, four, etc. The frame 1 has a bump 114 therein. By rotating of the brake pedal 2, the bump 114 may be engaged with one of the positioning slots 25, thereby positioning the brake pedal 2. But the disclosure is not limited thereto. For example, the positioning slots 25 may be disposed on the frame, and the bump 114 may be disposed on the brake pedal 2.

Referring to FIGS. 20-23, the linkage assembly 4 comprises a pushing part 41 and a. In this embodiment, both the pushing part 41 and pulling part 42 are upward and downward slidably disposed in the frame 1. The pulling part 42 is fixedly connected to a brake lock 5. By the brake drive assembly pushing the pushing part 41 to slide, the pushing part 41 may push the pulling part 42 to slide together with the brake lock 5. Specifically, the pushing part 41 comprises a first roller 414 and a plug pin 413. The first roller 414 is pivotally coupled to the plug pin 413, and the first roller 414 is in abutting connection with the brake drive assembly. The plug pin 413 is upward and downward slidably disposed in the frame 1, and the plug pin 413 is in abutting connection with the pulling part 42. By driving the drive members 3 to rotate, the driving parts 35 of the drive members 3 may push the first roller 414, such that the first roller 414 slide down together with the plug pin 413. Wherein, the first roller 414 can reduce the friction force received when the driving parts 35 rotates to push the first roller 414. Furthermore, a second elastic resetting member 43 for resetting plug pin 413 is provided between the plug pin 413 and the frame 1. Moreover, a compression spring may be used for the second elastic resetting member 43, and the second elastic resetting member 43 may be sleeved on the plug pin 413, but the disclosure is not limited thereto.

Continuously referring to FIGS. 20-23, the pulling part 42 comprises first fixing member 421 first traction member 422. The first fixing member 421 upward and downward slidably disposed in the frame 1 and located below the pushing part 41. One end of the first traction member 422 is fixedly connected to the first fixing member 421, and the other end of the first traction member 422 is fixedly connected to the brake lock 5. A middle portion of the first traction member 422 has an inverted U-shaped structure 422*a* and is supported on the frame 1. By the first fixing member 421 sliding down and pulling the first traction member 422, the first traction member 422 may pull the brake lock 5 up, such that the brake lock 5 are engaged with the wheels 6. By the plug pin 413 of the pushing part 41 pushing the first fixing member 421 to slide down, the first fixing member 421 may pull one end of the first traction member 422 to slide down, and the other end of the first traction member 422 to rise and pull the brake lock 5, such that the brake lock 5 may rise and are engaged with the wheels 6, thereby locking the wheels 6. Specifically, the pulling part 42 further comprises a reversing member 423. The reversing member 423 is fixed in the frame 1 and located on a side of the first fixing member 421. An inverted U-shaped structure 422*a* of the first traction member 422 is disposed to penetrate into the reversing member 423 and is supported in the reversing member 423. Preferably, a second roller 423*a* is pivotally connected to the reversing member 423 from an inner side, and the first traction member 422 is wound on the second roller 423*a*. the second roller 423*a* may reduce the friction force received by the first traction member 422 when it is pulled.

Referring to FIG. 24, the pulling part 42 may further comprise a second fixing member 424. The second fixing member 424 is upward and downward slidably disposed in the frame 1. One end of the second fixing member 424 is fixedly connected to the first traction member 422, and the other end of the second fixing member 424 is fixedly connected to a brake lock 5. But the disclosure is not limited thereto. For example, the first traction member 422 may also be fixedly connected to the brake lock 5. Moreover, a steel wire may be used for the first traction member 422. But the disclosure is not limited thereto. A rope or the like may also be used for the first traction member 422. Furthermore, the pulling part 42 may further comprise a third elastic resetting member 425 for resetting the second fixing member 424. The third elastic resetting member 425 is disposed between the second fixing member 424 and the frame 1. When the first traction member 422 pulls the second fixing member 424 to slide up, the second fixing member 424 compresses the third elastic resetting member 425. When the second fixing member 424 is released, the second fixing member 424 may slide and be reset under action of the elastic restoring force of the third elastic resetting member 425, such that the brake lock 5 is driven to slide and be reset, thereby disengaging the brake lock 5 from the wheel 6.

With reference to FIGS. 16-24, the specific working principle of the baby carriage brake mechanism 100 of the second embodiment of the disclosure will be discussed as follows.

When the wheel 6 needs to be braked, the brake pedal 2 may be stepped on, so the brake pedal 2 rotates together with the drive member 3. The driving part 35 of the drive members 3 pushes the first roller 414 of the pushing part 41 of the linkage assembly 4, such that the first roller 414 slides down together with the plug pin 413. In turn, sliding down of the plug pin 413 may push the first fixing member 421 of the pulling part 42 to slide, and pull one end of the first traction member 422 to down, while the other end of the first traction member 422 rises, such that the first traction member 422 pulls the second fixing member 424 to slide up together with the brake lock 5, causing the brake lock 5 to be engaged with the engaging slots 621 of the wheel 6, thereby locking the wheels 6 on both sides. In this way, braking of both rear wheels of the baby carriage 200 may be realized by one stepping on, hence facility of the braking operation of the baby carriage 200 is improved.

When the wheel 6 needs to be unlocked, the brake pedal 2 may be driven to rotate reversely, and the brake pedal 2 drive the drive member 3 to rotate and reset, so the entire linkage assembly 4 would be reset under action of the second elastic resetting member 43 and the third elastic resetting member 425, and drive the brake lock 5 to reset, accordingly, the brake locks 5 may disengaged from the wheel 6, thereby unlocking the wheels 6 on both sides.

Referring to FIGS. 1 and 2, a frame 1 comprises a frame body 11, two rotating parts 12 which are pivotally connected to both of left and right sides of the frame body 11 respectively, and wheels 6 pivotally connected to the rotating parts 12.

Referring to FIGS. 1-4, the baby carriage of the disclosure 200 may further comprise a push and drift operating part 202 and a rotation orientation assembly 203. The push and drift operating part 202 is disposed on a frame body 11. One end of the rotation orientation assembly 203 is coupled to the push and drift operating part 202, and the other end of the rotation orientation assembly 203 is engaged between the frame body 11 and a rotating part 12. By operation of the push and drift operating part 202, the rotation orientation assemblies 203 may disengage from the rotating part 12. Specifically, the rotation orientation assembly 203 comprises a second traction member 203*a* and an orienting member 203*b*. The push and drift operating part 202 is connected to one end of the second traction member 203*a* and may pull the second traction member 203*a*, and the other end of the second traction member 203*a* is connected to the orienting member 203*b*. The orienting member 203*b* is engaged between the frame body 11 and the rotating part 12, so as to lock the frame body 11 and the rotating part 12. By operation the push and drift operating part 202, the push and drift operating part 202 may pull the second traction member 203*a*, such that the second traction member 203*a* pull the orienting member 203*b* to slide and disengaged from the rotating part 12, thereby unlocking the frame body 11 and the rotating part 12, causing the rotating part 12 to rotate 360 degrees together with the wheels 6 in respect to the frame body 11. In this embodiment, the wheels 6 are real wheel. But the disclosure is not limited thereto. Moreover, the second traction member 203*a* is a steel wire, but the disclosure is not limited thereto. An rope or the like may be used for the second traction member 203*a*. Furthermore, the rotation orientation assembly 203 may further comprise a fourth elastic resetting member 203*c* for resetting the orienting member 203*b*. The fourth elastic resetting member 203*c* is disposed between the orienting member 203*b* and the frame body 11. When the push and drift operating part 202 is operated to drive the second traction member 203*a* in order to pull the positioning member 7 to slide up, the positioning member 7 may compress the fourth elastic resetting member 203*c*. After the push and drift operating part 202 is released, the positioning member 7 may slide down and be reset under action of the fourth elastic resetting member 203*c*, such that the positioning member 7 is engaged between the frame body 11 and the rotating part 12 again, thereby locking the frame body 11 and the rotating part 12. It would be noted, by pressing the push and drift operating part 202 to pull the second traction member 203*a* is known in the related art, so the structure of the push and drift operating part 202 would not be redundantly discussed here.

When the baby carriage 200 needs to be driftable, the push and drift operating part 202 may be pressed so the push and drift operating part 202 may pull the second traction member 203*a*, such that the second traction member 203*a* pull the orienting member 203*b* to slide to disengaged from the rotating part 12, thereby unlocking the frame body 11 and the rotating part 12, causing the rotating part 12 to rotate 360 degrees to gather with the wheels 6 in respect with the frame body 11. When the push and drift operating part 202 is released, the push and drift operating part 202 reset, and the orienting member 203*b* reset and is engaged between the frame body 11 and the rotating part 12 under action of the fourth elastic resetting member 203*c*, thereby locking the frame body 11 and the rotating part 12.

In conclusion, the baby carriage 200 of the disclosure has a baby carriage brake mechanism 100. So, by driving the brake drive assembly to push the linkage assemblies 4 on both sides to slide, the linkage assemblies 4 on both side may respectively drive the brake locks 5 on both sides to act, such that the brake locks 5 on both sides are respectively engaged with the wheels 6 on both sides, thereby locking the wheels 6 on both sides. Therefore, the baby carriage of the disclosure 200 may realize braking of the wheels 6 on both sides at the same time by operation of the baby carriage brake mechanism 100, and is characterized by simple and easy operation. The baby carriage of the disclosure 200 may also have a push and drift operating part 202 and a rotation orientation assembly 203, so as to realize universal rotating or orienting of the wheels 6.

The above disclosure should be considered to be only preferred examples, and the scope of the disclosure cannot be limited thereto. Therefore, all equivalent variants made according to the claims of the disclosure fall within the scope of the disclosure.

What is claimed is:

1. A baby carriage brake mechanism comprising a frame, a brake drive assembly, two linkage assemblies, brake locks and wheels, wherein:
    the brake drive assembly is disposed on the frame,
    the two linkage assemblies are respectively slidably disposed on the frame on both of left and right sides,
    both ends of the brake drive assembly are respectively in abutting connection with the two linkage assemblies,
    all the linkage assemblies are coupled to the brake locks, the wheels are pivotally disposed at both of left and right sides of the frame respectively, and
    by driving the brake drive assembly to push the linkage assemblies to act together with the brake locks, the brake locks on both sides are engaged with the wheels,
    each of the linkage assemblies comprises a pushing part and a pulling part, and both the pushing part and the pulling part are upward and downward slidably disposed in the frame,
    the pulling part is fixedly connected to the brake lock, and
    by the brake drive assembly pushing the pushing part to slide, the pushing part pushes the pulling part to slide, and the pulling part pulls a corresponding brake lock.

2. The baby carriage brake mechanism according to claim 1, wherein:
    the brake drive assembly comprises a brake pedal and two drive members,
    the brake pedal is upward and downward slidably disposed on the frame,
    both ends of the brake pedal are respectively in abutting connection with the two drive members,
    the two drive members are leftward and rightward slidably disposed on the frame,
    the two drive members are in abutting connection with the linkage assemblies, and
    by driving the brake pedal to slide, the two drive members are pushed to slide, such that the two drive members respectively drive the two linkage assemblies to act.

3. The baby carriage brake mechanism according to claim 2, wherein:
    the brake drive assembly further comprises an elastically deformable positioning member having two ends,
    the brake pedal has a first tracking slot and a second tracking slot,
    the first tracking slot is located below the second tracking slot,
    one end of the first tracking slot is in communication with one end of the second tracking slot,
    one end of the positioning member is fixed in the frame, and
    by driving the brake pedal to slide, the other end of the positioning member is alternately engaged at a lowest position of the first tracking slot and a lowest position of the second tracking slot.

4. The baby carriage brake mechanism according to claim 3, wherein:
    both the first tracking slot and the second tracking slot have a concave structure, and
    both ends of the first tracking slot are respectively in communication with both ends of the second tracking slot,
    wherein both the first tracking slot and the second tracking slot are V-shaped.

5. The baby carriage brake mechanism according to claim 2, wherein:
    the brake drive assembly further comprises a first elastic resetting member for resetting the brake pedal, and
    the first elastic resetting member is disposed between the brake pedal and the frame.

6. The baby carriage brake mechanism according to claim 1, wherein:
    the brake drive assembly comprises a brake pedal and drive members,
    the brake pedal is fixedly connected to the drive members, the drive members is pivotally coupled to the frame, both ends of the drive members are respectively in abutting connection with the two linkage assemblies, and by driving the brake pedal to rotate together with the drive members, the drive members push the linkage assemblies to act.

7. The baby carriage brake mechanism according to claim 6, wherein:

the drive members comprises a driving body and two driving parts, the driving body is pivotally coupled to the frame, the two driving parts are respectively protruding at both ends of the driving body, and the two driving parts are in abutting connection with the linkage assemblies.

8. The baby carriage brake mechanism according to claim 1, wherein:

the pushing part comprises a pushing member and a plug pin, the pushing member is upward and downward slidably disposed in the frame, and one end of the plug pin is fixedly connected to the pushing member, and the other end of the plug pin is in abutting connection with the pulling part.

9. The baby carriage brake mechanism according to claim 1, wherein:

the pushing part comprises a first roller and a plug pin, the first roller is pivotally connected to the plug pin, the first roller is in abutting connection with the brake drive assembly, the plug pin is upward and downward slidably disposed in the frame, and the plug pin is in abutting connection with the pulling part.

10. The baby carriage brake mechanism according to claim 1, wherein:

the pulling part comprises a first fixing member and a first traction member, the first fixing member is upward and downward slidably disposed in the frame, one end of the first traction member is fixedly connected to the first fixing member, and the other end of the first traction member is fixedly connected to the brake lock, and by the first fixing member sliding and pulling the first traction member to move, the first traction member pulls the corresponding brake lock, such that the brake lock is engaged with one of the wheels.

11. The baby carriage brake mechanism according to claim 10, wherein:

a middle portion of the first traction member has an inverted U-shaped structure and is supported on the frame, such that the first traction member moves by sliding down of the first fixing member.

12. The baby carriage brake mechanism according to claim 11, wherein:

the pulling part further comprises a reversing member, the reversing member is fixed in the frame and located on a side of the first fixing member, and the inverted U-shaped structure of the first traction member is disposed to penetrate into the reversing member, wherein:

a second roller is pivotally connected to the reversing member from an inner side, and the first traction member is wound on the second roller.

13. The baby carriage brake mechanism according to claim 10, wherein:

the pulling part further comprises a second fixing member, the second fixing member is upward and downward slidably disposed in the frame, and one end of the second fixing member is fixedly connected to the first traction member, and the other end of the second fixing member is fixedly connected to the brake lock.

14. The baby carriage brake mechanism according to claim 13, wherein:

the pulling part further comprises a third elastic resetting member for resetting the second fixing member, and the third elastic resetting member is disposed between the second fixing member and the frame.

15. A baby carriage comprising seat part, wherein:

the baby carriage further comprises the baby carriage brake mechanism of claim 1, and the seat part is disposed on the frame.

16. The baby carriage according to claim 15, wherein:

the frame comprises a frame body and rotating parts, the rotating parts are pivotally connected to the frame body on both of left and right sides respectively, and the wheels are pivotally connected to the rotating parts.

17. The baby carriage according to claim 16, wherein:

the baby carriage further comprises a push and drift operating part and a rotation orientation assembly, the push and drift operating part is disposed on the frame body, one end of the rotation orientation assemblies is coupled to the push and drift operating part, and the other end of the rotation orientation assemblies is engaged between the frame body and the rotating part, and by operation of the push and drift operating part, the rotation orientation assembly is disengaged with the rotating part.

18. The baby carriage according to claim 17, wherein:

the rotation orientation assembly comprises a second traction member and an orienting member, one end of the second traction member is connected to and capable of being pulled by the push and drift operating part, and the other end of the second traction member is coupled to the orienting member, and the orienting member is engaged between the frame body and the rotating part.

\* \* \* \* \*